March 12, 1946.  W. J. BESLER ET AL  2,396,241
SPACER BAR
Filed Aug. 25, 1943  2 Sheets-Sheet 1

INVENTORS.
WILLIAM J. BESLER.
JOHN L. BOYEN.
BY Henry Gifford Hardy
ATTORNEY.

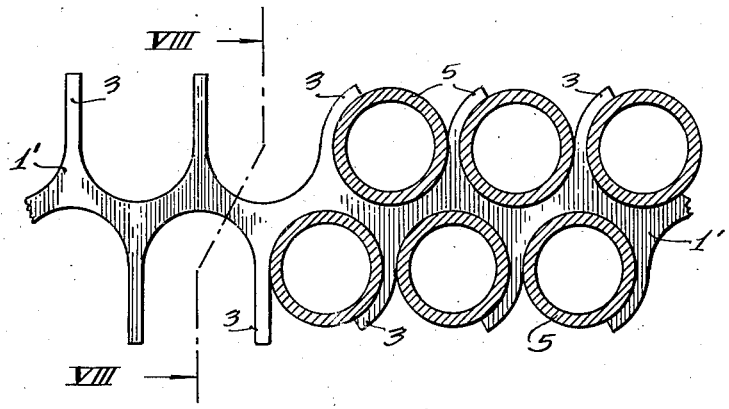
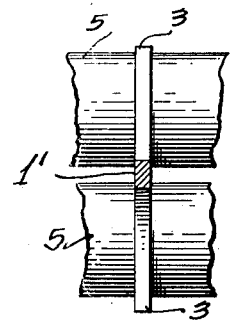
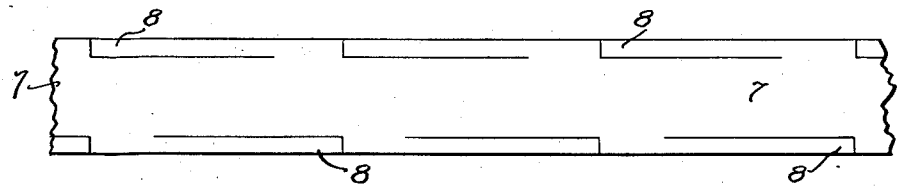
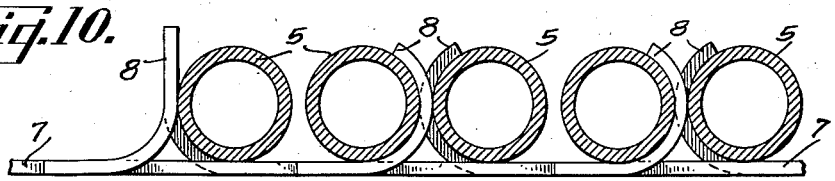

Patented Mar. 12, 1946

2,396,241

UNITED STATES PATENT OFFICE 2,396,241

SPACER BAR

William J. Besler, Happy Valley, and John L. Boyen, Orinda, Calif., assignors to Besler Systems, a corporation of California Application August 25, 1943, Serial No. 500,025

9 Claims. (Cl. 248—68)

There are many conditions in industry and in the fabrication of machinery and equipment where it becomes not only desirable but necessary to hold banks or coils of tubing in spaced relation and to maintain them in this relation with a minimum of binding or with fixed attachment. The present invention relates to means for holding tubes, cables and the like in spaced relation and maintaining them in this position without securing the said members in fixed relationship, and in some instances permanently.

In the making of flat spiral coils for boilers and the like, it has been the custom of the industry to weld flat strips extending radially, to hold the coils in position. To do this and obtain the proper spacing, the strips were secured in position by welding them on to the tubing while the coil was still on the winding device. This necessarily rendered it useless for winding further coils until the welding of the radial bars was finished. It will be seen that accurate spacing could not be maintained and wherever welding or other means of rigidly securing the tubing to the spacing member is involved there is the actual damage done in making this union which, in welding, results from the heat of the welds. Also the rigidity of the attachment results in unequal expansion and contraction causing unequal strains and stresses both against the strap and the tubing which may result in damage of a serious nature.

Accordingly, it is among the objects of the present invention to provide a means for assembling, bracing and holding interspaced tubing, cable or the like, whether in parallel, spiral or concentric arrangement.

It is also an object of the present invention to provide a holding member which allows for expansion and contraction within the assembly and without distorting its desired form or bringing about any undesirable stresses or strains.

Another object is the provision of a spacer bar that may be attached after the members to be spaced have been formed but without the necessity of being attached either at the time of forming or while the members are still on the forming machine.

Another object of the invention is the provision of a spacer bar that may be easily attached to the assembled parts without mutilating or scarring their superficial areas or providing direct attachment thereto.

Still another object is the provision of a spacer bar combining the necessary strength with a minimum of weight and mass of material, which can be attached with a minimum of time by unskilled workmen.

Further objects are to provide a construction of maximum simplicity, economy and ease of assembly and includes such further objects, advantages and capabilities as will later more fully appear as this description proceeds and which are inherently possessed therein.

The invention further resides in the combination, construction, and arrangement of parts illustrated in the accompanying drawings and while there is shown therein preferred embodiments, it is to be understood that the same are capable of modification and change and comprehend other details of construction without departing from the spirit of the present invention and the scope of the appended claims.

Referring to the drawings:

Figure 7 is an elevational view showing a still further modification for simultaneously spacing vertical banks of coils;

Figure 8 is a section taken on the line VIII—VIII of Figure 7;

Figure 9 is a plan view of a flat blank indicating longitudinal tangs;

Figure 10 is an elevational view of the blank shown in Figure 9 with tube sections assembled thereby.

Like reference characters are used to designate similar parts in the drawings and in the description of the invention which follows:

Figure 1:
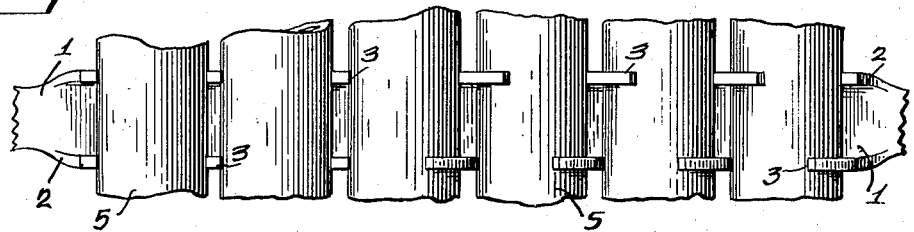
Figure 1 is a plan view of a bank of tube sections assembled in a spacer bar in accordance with the present invention.
Figure 3:
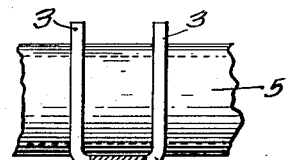
Figure 3 is a detail of the same in section taken on the line III—III of Figure 2, looking in the direction of the arrows.
Figure 2:
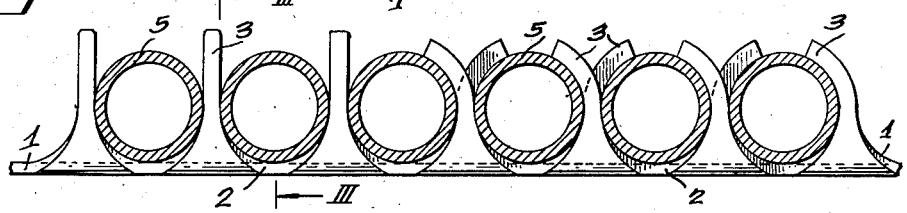
Figure 2 is an elevational view of the same.

Referring more particularly to the drawings disclosing the invention herein, and with particular reference to Figures 1, 2 and 3, the device consists essentially of a strip of sheet material having its lateral margins cut away in semi-circular form as at 2, leaving outwardly extending tangs 3. After the blank strip material is thus die cut, the tangs are bent upwardly so that they stand substantially perpendicular to the base 1. It will be observed that these strips can readily be fabricated in this manner to any desired lengths or may be in continuous lengths and cut subsequently into bars for meeting the varying conditions.

As shown by Figures 1 and 2 the tubes 5, cables or any other objects to be spaced are placed within the semi-circular cuts which are now oppositely disposed and the upwardly extending tangs 3 separate the coils 5 by the exact width of the tangs themselves. The left portions of Figures 1 and 2 respectively, show the manner of inserting the members to be spaced within the spacer bar. At the right side of these figures is shown the manner of holding the spaced members in position after being inserted in the spacer bar. Here it will be seen that in order to provide a retaining means above as well as by the base 1 below the tangs 3 on one side of the bar are bent in one direction over the tube 5 and preferably those on the other side of the spacer bar are bent in the opposite direction. Thus the tangs 3 partly encircle their respective tubes or members 5 and hold them to the bar and to each other and so form a complete assembly held in spaced position without the necessity of welding or in any other manner making a rigid and fixed engagement. It will be observed that if the character of the tubes 5 or other members to be held in spaced relation are of such material as to warrant, the tangs 3 can be bent by hammering them into shape around the perimeter. If the tubes or other members are frail such as certain kinds of plastics, or fragile such as glass, it is advisable to bend the tangs 3 by pressure between the base 1 and the tops of the tangs 3 by any suitably formed die that will bend the tangs preferably in opposite directions on the opposite sides of the base 1 respectively.

In installations where the tubes 5 or the like, carry fluids or gases that may vary in temperature from time to time, it is advisable not to clinch the tangs too tightly around them in order to allow substantial freedom for expansion, elongation and contraction. In view of the fact that the tubes themselves are not fixed to the transverse spacing bar, any difficulty which might be encountered because of a difference in the coefficient of expansion of the material of the tubes and that of the spacer bar is entirely eliminated.

Figure 4:
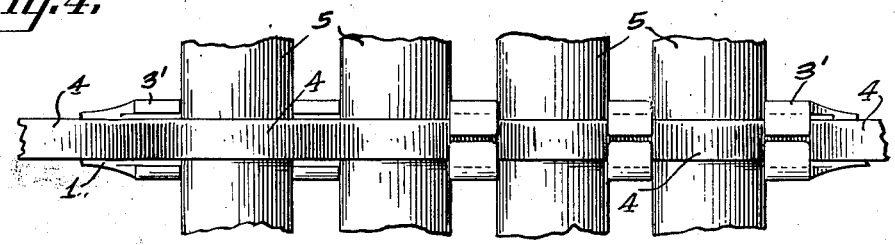
Figure 4 is a view similar to Figure 1 showing a modification of the spacer bar and including a reinforcing spacer strap.
Figure 5:
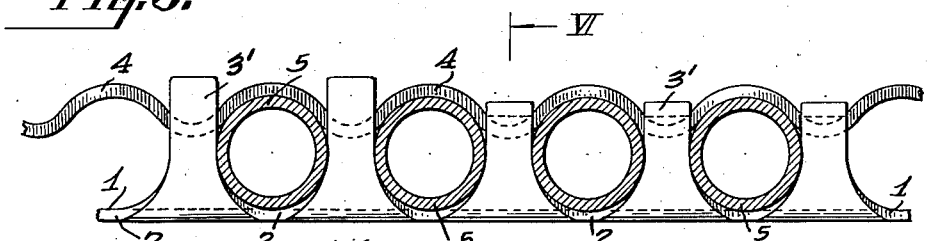
Figure 5 is an elevational view of the same.
Figure 6:
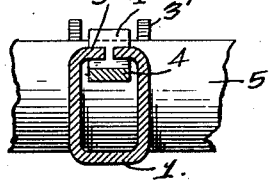
Figure 6 is a detail in section taken on the line VI—VI of Figure 5, looking in the direction of the arrows.

In assembling heavier tubes or members or where more space is desirable between the tubes or members 5, not only may the tangs 3 be made larger as shown by tangs 3' as shown in Figures 4 and 5 but a serpentine strap spacing member 4 may be used additionally. The general structure of the spacer bar is the same as that shown and described above in connection with Figures 1 and 2 but where the spacer strap 4 is used in addition, it is placed on top of the coils or members 5. After being placed in appropriate position in the spacer bar and the tangs 3' are clinched or bent transversely to the base 1 as shown in Figure 6. The serpentine spacer straps 4 pass over the tubes or members 5 and under the inturned ends of the tangs 3'. The portions to the left in Figures 4 and 5 indicate the coils or members 5 in position on the spacer bar, the spacer strap 4 in position on the side opposite to that of the body 1 and with the tangs 3' still in vertical position. On the right hand portion of these same two figures is shown the tangs 3' clinched or bent transversely to the base 1 and over the serpentine straps 4 holding all of the members as a unitary structure without welding or any other form of fixed attachment.

In Figure 7 is shown a modification in which two banks of coils or members 5 may be spaced not only with respect to themselves in each bank but with respect to another bank. In this form the base 1' is in the same plane as the tangs 3. The tangs are shown to be in staggered relation, still it is apparent that any spacing or relationship not only between the coils of one bank but between the two banks of coils themselves may be obtained. As shown in Figure 7 the tangs 3 are preferably bent in opposite directions above and below to secure the best results.

There is a still further embodiment shown in Figure 9 which consists of a strip or body member 7 with tangs 8 cut longitudinally on the marginal edges and preferably in opposite directions on the opposite sides as shown in Figure 9. Either prior to or while the members 5 are being placed in position the tangs may be bent upwardly, longitudinally to secure the members 5 in place as shown in Figure 10. This form accomplishes a great saving in material and if the material permits, it can also be wound flat in reels adapted to be unwound and cut to length when desired. If the strips are made from a suitable material, such as a plastic, the tangs could be bent or formed in shape at the time of application. It is also apparent that if the members to be spaced and held do not demand too much weight, adhesive can be placed on the back of the base member 1 or 7 as the case may be.

While only horizontal, parallel arrangements of tubes or members 5 have been shown or illustrated in the drawings, it is obvious that the spacer bars function also in a vertical or any other arrangement of the members to be spaced. They are equally applicable in spacing and holding spirally wound members in conical, hemispherical, flat or other forms by appropriate setting or spacing the spacer bar as to size.

In most instances and particularly where heat is involved pliable low carbon steel is the preferable material for the bars but any suitable material can be used to meet the special conditions encountered.

In addition to the uses shown and described in spacing and assembling banks of tubes, spacer bars in accordance with this invention are useful as brackets for holding or suspending electric cables or conduits and also for arranging piping along walls and other similar uses.

We claim:

1. A spacer bar capable of both spacing and holding a series of members comprising a strip of material having a plurality of integral spaced tangs extending laterally therefrom adapted to be placed between said members for accurately spacing the same and adapted to be bent at their extremities to hold said spaced members therebetween.

2. A spacer bar capable of both spacing and securing a series of members comprising a strip of material having a plurality of integral oppositely disposed laterally extending spaced tangs thereon adapted to be placed between and to be bent to secure spaced members therebetween.

3. A spacer bar comprising a strip of material having a plurality of integral laterally extending spaced tangs on its opposite marginal sides, adapted to be inserted between a series of members for spacing the same and to be shaped to retain spaced members therebetween without fixed attachment.

4. A spacer member comprising a strip of material having a plurality of integral laterally extending spaced tangs on its opposite sides, said tangs being arranged in alignment substantially perpendicular to the plane of the base of said member and for insertion between a series of objects to space the same and adapted to be bent to secure said spaced objects therebetween.

5. A spacer assembly comprising a strip of material having a plurality of integral spaced tangs on its opposite marginal edges arranged for alignment substantially perpendicular to the plane of the base of said strip and adapted to be clinched at their extremities, and a serpentine spacer strap aligned with said base and secured beneath the clinched ends of said tangs.

6. In combination with a series of members to be spaced and secured, a spacer bar transverse thereto having a plurality of integral tangs on the marginal edges thereof extending from the base of said bar between said members for spacing the same, and a serpentine spacing strap aligned with said bar but on the opposite side of said members, said tangs being adapted to be bent over said strap to hold said members and said strap to said bar.

7. A spacer bar capable of both spacing and retaining a series of members comprising a strip of material having a plurality of integral tangs longitudinally along the marginal edges thereof adapted to space and be bent upwardly to retain a series of spaced members.

8. A spacer bar capable of both spacing and securing a series of members to be spaced, comprising a strip of material having a plurality of integral oppositely disposed laterally extending spaced tangs thereon adapted to be placed between and to be bent to secure spaced members therebetween and a layer of adhesive on the back of said strip to secure the same to a surface.

9. A spacer bar capable of both spacing and retaining a series of members comprising a strip of material having a plurality of integral tangs longitudinally along the marginal edges thereof adapted to be bent upwardly to space and retain a series of spaced members and a layer of adhesive on the back of said strip to secure the same to a surface.

WILLIAM J. BESLER.
JOHN L. BOYEN.